United States Patent
Watson et al.

[11] Patent Number: 5,946,303
[45] Date of Patent: *Aug. 31, 1999

[54] AUTOMATIC CONFIGURATION OF A REMOTE COMMUNICATION INTERFACE VIA THE ALARM INDICATION SIGNAL

[75] Inventors: Godfrey Dewar Watson, Montara; Marcel Bruno Manzardo, Palo Alto, both of Calif.

[73] Assignee: Siemens Information and Communication Networks, Inc., Boca Raton, Fla.

[*] Notice: This patent issued on a continued prosecution application filed under 37 CFR 1.53(d), and is subject to the twenty year patent term provisions of 35 U.S.C. 154(a)(2).

[21] Appl. No.: 08/564,885

[22] Filed: Nov. 29, 1995

[51] Int. Cl.$^6$ ................................ H04J 3/02; H04Q 9/00
[52] U.S. Cl. ..................... 370/254; 370/466; 370/522; 340/825.17; 340/825.36; 375/220
[58] Field of Search ........................................ 370/241, 242, 370/244, 254, 276, 282, 465, 466, 467, 522, 525, 526; 340/500, 502, 505, 506, 507, 825.06, 825.16, 825.17, 825.36, 825.54; 455/67.1, 67.7; 375/219, 220, 222

[56] References Cited

U.S. PATENT DOCUMENTS

| | | | |
|---|---|---|---|
| 3,611,361 | 10/1971 | Gallichotte et al. | 340/505 |
| 3,689,888 | 9/1972 | Wooton | 340/539 |
| 4,184,118 | 1/1980 | Cannalte et al. | 370/345 |
| 4,551,718 | 11/1985 | Cookson et al. | 340/825.16 |
| 4,628,309 | 12/1986 | Allias | 340/825.54 |
| 4,680,773 | 7/1987 | Amundson | 375/222 |
| 5,272,700 | 12/1993 | Hansen et al. | 370/496 |
| 5,481,562 | 1/1996 | Pearson et al. | 375/222 |
| 5,568,135 | 10/1996 | Shinozaki | 340/825.06 |
| 5,572,201 | 11/1996 | Graham et al. | 340/902 |

Primary Examiner—Alpus H. Hsu

[57] ABSTRACT

A method for communicating configuration information between two interface devices connected to a communication link in a system in which each device is capable of generating and recognizing an alarm indication signal (AIS) indicating that the device generating the AIS is not available for communication. In a communication system utilizing the present invention, each interface device is capable of modulating the AIS signal and recognizing a modulated AIS signal. A first modulation pattern is used to establish communication between devices with incompatible configurations. Configuration information is then sent from one of the devices by utilizing a second modulation pattern.

8 Claims, 1 Drawing Sheet

AUTOMATIC CONFIGURATION OF A REMOTE COMMUNICATION INTERFACE VIA THE ALARM INDICATION SIGNAL

FIELD OF THE INVENTION

The present invention relates to telecommunication systems, and more particularly, to systems in which two devices communicate via PCM-24/T1 or PCM-30/E1 communication links.

BACKGROUND OF THE INVENTION

Many organizations have offices that are geographically dispersed. To provide communication between offices, the organizations often rent dedicated lines from the telephone company or other communication providers. For example, "T1" lines may be leased from local telephone companies in the United States. T1 lines have a band width of 1.544 MB. In Europe, "E1" 2.048 MB(PCM-30) lines serve a similar function.

The interface circuits at each end of such a communication line convert data input thereto to one of a number of formats for transmission over the T1 line. The communication format provides error correction and other features that insure that data will be transmitted with a minimum of errors while maintaining as high a through-put as possible. "Packaging" of data into frames with error encryption data that allows the receiver to correct errors that occur in transmission is well known to those in the communication art and hence will not be discussed in detail here. For the purposes of the present discussion, it is sufficient to note that there are a number of different packaging options.

In addition, long distance communication requires the use of repeaters to compensate for power lost during transmission. These repeaters must remain in synchronization with each other. One method for maintaining synchrony relies on the transitions between ones and zeros in the data stream being transmitted. This scheme requires a minimum density of ones in the data stream to maintain synchronization of the repeaters. To guarantee that the minimum density is used, various coding schemes insert data into the frames. The precise scheme used, in general, depends on the provider of the T1 line.

From the foregoing discussion, it will be apparent that there are a large number of possible transmission protocols that must be accommodated by the interface devices. Furthermore, to provide a communication interface, the devices at each end of the communication link must use matching protocols.

In principle, the protocols used at each end of the communication link are synchronized at the time the communication link is set up and the interface devices installed. However, even if the devices are correctly configured when the communication link is installed, the replacement of one of the devices or a loss of configuration information in one of the devices due to a power failure and/or transients can lead to a situation in which one of the devices must be reconfigured to match the other device on the communication link.

If the device requiring re-configuration is not at a location that is proximate to qualified service personnel, the reconfiguration can be costly, as a service person must be dispatched to make the required changes. In addition, even if personnel are available on site, it would be advantageous to provide a system in which the device requiring reconfiguration can be configured by the device at the other end of the communication link.

Broadly, it is the object of the present invention to provide an improved communication interface for PCM-24/T1 or PCM-30 communication links.

It is a further object of the present invention to provide an interface for PCM-24/T1 or PCM-30 communication links that can be configured from a remote location.

These and other objects of the present invention will become apparent to those skilled in the art from the following detailed description of the invention and the accompanying drawings.

SUMMARY OF THE INVENTION

The present invention comprises a method for communicating configuration information between two interface devices connected to a communication link in a system in which each device is capable of generating and recognizing an alarm indication signal (AIS) indicating that the device generating the AIS is not available for communication. In a communication system utilizing the present invention, each interface device is capable of modulating the AIS signal and recognizing a modulated AIS signal. A first modulation pattern is used to establish communication between devices with incompatible configurations. Configuration information is then sent from one of the devices by utilizing a second modulation pattern.

DETAILED DESCRIPTION OF THE INVENTION

Figure 1:
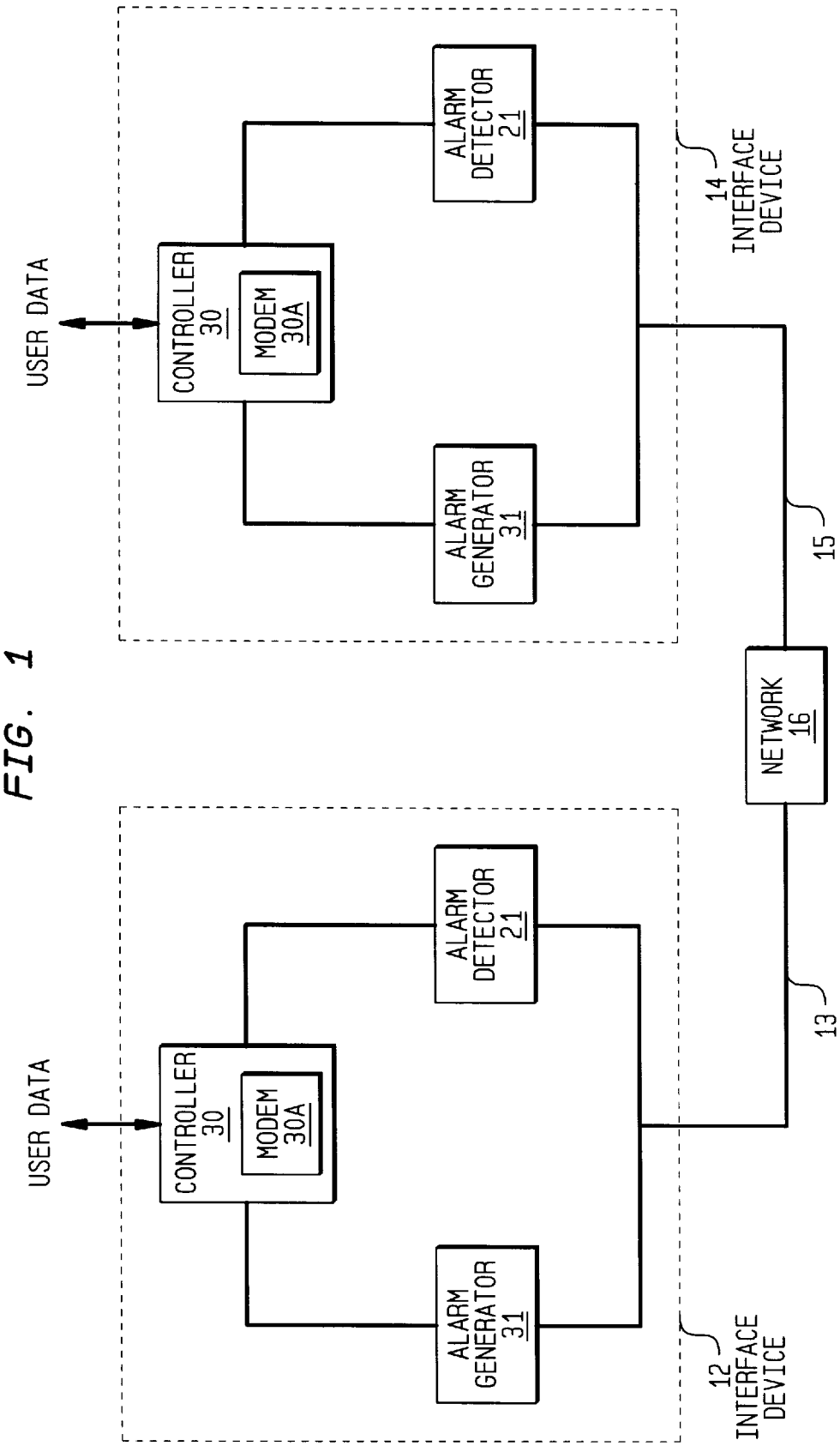
FIG. 1 is a block diagram of a communication system utilizing two interface devices according to the present invention.

Consider two devices connected via T1 lines through the interconnect network, either privately owned or provided by a local telephone company. A block diagram of such an arrangement is shown in FIG. 1. Each device connects a user to another user via the T1 lines. It will be assumed that one of the devices has already been configured for a particular protocol. This device will be referred to as the master device in the following discussion. The master device is shown at 12 in FIG. 1. Master device 12 is connected to remote device 14 through telephone network 16 via a T1 line 13. Similarly, remote device 14 is connected to network 16 via T1 line 15. It will be assumed that remote device 14 is either not configured to any particular protocol or that it is configured for a different protocol than used by master device 12.

The present invention is based on the observation that all interface devices that connect to T1 and PCM-30 lines recognize an alarm indication signal (AIS). An AIS is sent on the communication link when the device is not properly configured to prevent other devices from attempting to communicate with the non-configured device. The AIS consists of a continuous string of ones. T1 and PCM-30 communication links are configured to accept such a string of ones from one device and to pass the string to the device connected to the other end of the communication link. The present invention modulates the AIS as a means of transmitting information from one device to the other so that sufficient configuration information may transferred between the master device and the remote device to allow the remote device to configure itself to a mode in which it can communicate with the master device using a more conventional protocol.

Referring again to FIG. 1, each device includes an alarm signal detector 21. When a sufficiently long string of ones is detected on the communication link, detector 21 generates a signal indicative of an AIS on the communication link. If the AIS on the communication link is modulated, the output of detector 21 will also be modulated. The output of detector 21 is monitored by a controller 30. A modulator-demodulator (modem) 30A is included in controller 30.

In one embodiment of the present invention, each of the controllers has been programmed to recognize a first predetermined modulation pattern as being indicative of a logical one and a second predetermined pattern as being indicative of a logical zero being sent by the interface device at the other end of the communication link. Hence, the communication language is fixed and the remote device need only communicate its need for configuration information by some predetermined message sequence, referred to as a request for configuration message sequence. Upon receiving the request for a configuration message sequence, the local device need only send a confirmation message including the requested configuration information. The confirmation message is sent by modulating an AIS via AIS generator 31.

The above embodiment assumes that both devices have been configured to communicate using the modulated AIS protocol. In practice, a device seeking configuration information cannot be sure that the device at the other end of the communication link is configured to communicate in the AIS protocol. Furthermore, the device receiving an intermittent AIS signal cannot be sure that the signal is a message requesting configuration information or the result of a malfunction in the sending device. Hence, the preferred embodiment of the present invention utilizes a "hand shaking" protocol to establish the communication using the AIS protocol and to verify the receipt of the configuration information.

The precise hand shaking protocol implemented is a matter of engineering choice. For the purposes of the present discussion, it is sufficient to note that the device requesting configuration information sends a request sequence. The device receiving the request sequence sends back a confirmation message. The requesting device then sends an acknowledgment of the confirmation message. The request and confirmation messages must be chosen such that the probability of a malfunction in the requesting device generating both of these messages is sufficiently small. This condition will be satisfied if the messages are different and sufficiently long. In one embodiment of the present invention, the confirmation is accomplished by repeating the request message back to the sender.

The above described modulation of the AIS must be sufficiently slow to assure that any intermediate devices in network 16 perceive the signal as being an intermittent AIS signal. In one embodiment of the present invention, a pulse in the modulated signal is generated by turning the AIS off for 200 ms and then on for 100 ms. It is apparent from this example, that the data rate in the AIS communication mode is extremely low.

If this data rate is too low to accommodate full configuration of a remote device, an intermediate protocol with a higher data rate may be employed. In this embodiment of the present invention, the devices establish that each is configured for AIS communication. The device specifying the configuration first specifies an intermediate configuration chosen from a small list of possible such configurations. This intermediate configuration may be specified by a simple message giving the intermediate protocol number in the list of possible intermediate protocols. Such a message requires only a few bits. The device to be configured then configures itself for the intermediate protocol and continues communication in the intermediate protocol which has a data rate sufficient to receive a message providing the full configuration in an acceptable time.

Having described the basic operation of the AIS configuration protocol, the various startup protocols according to the present invention will now be discussed in more detail. In one embodiment of the present invention, when a first interface device is first connected to the T1 line, it is programmed to transmit AIS toward its partner, referred to device #2. Within a predetermined time period, the first device expects to receive an AIS back from the second device. If the first device receives a modulated AIS having a first pattern, the first device responds with a second acknowledgment pattern and both devices enter the AIS communication mode. Once in the mode, the second device can transmit its normal communication protocol to the first device so that the two devices will now be configured to the same protocol. Alternatively, the first device can send a command to the second device indicating that the first device will specify the protocol to be used and then send the protocol.

If instead of receiving the first pattern from the device #2, the first device receives some other signal, a possible mismatch is assumed. In this case, the first device initiates the AIS protocol described above by transmitting a modulated AIS signal having the first pattern and looks for the second pattern from device #2. Once the first device receives the second pattern, the first device acknowledges the receipt and the devices proceed to exchange configuration information as described above.

During normal operation, i.e., after both devices have been properly configured, device #1 indicates that it is incapable of transmitting in the configured protocol by sending AIS to device #2. Device #2 responds with a remote alarm indication (RAI) as required. Device #2 is also looking for an AIS pattern; however, since no pattern is sent, no configuration action is taken by Device #2. Later, when Device #1 has recovered, it ceases transmitting AIS to device #2. Device #2 will eventually cease transmitting RAI, and normal operation will be resumed.

While the above description has referred to separate detectors and generators for the AIS signal, it will be appreciated that these functions can be included in controller 30. Further, the AIS detectors, modulators, and demodulators may also be included in controller 30 described above. In the preferred embodiment of the present invention, the present invention is implemented via firmware provided as part of the controller already present in the interface devices.

The present invention has been described in terms of interface devices for T1 or PCM-30 communication links. However, it will be apparent to those skilled in the art from the preceding discussion that the present invention may be extended to any communication system in which the interface devices already implement some form of alarm indication signal that is recognized by interface devices that connect to the communication link in question.

Furthermore, it will be appreciated that the exact form of the AIS signal is not critical to the present invention. Any repeated pattern that is recognized by the interface devices may be utilized provided the pattern is capable of being modulated in a manner that can be recognized by a device receiving the modulated signal.

Various modifications to the present invention will become apparent to those skilled in the art from the foregoing description and accompanying drawings.

Accordingly, the present invention is to be limited solely by the scope of the following claims.

What is claimed is:

1. A communication system in which first and second interface devices are connected via a communication link, each said interface device having a plurality of communication modes and each said interface device including means for sending an alarm indication signal (AIS) indicating that the interface sending the AIS is not configured to a protocol that matches the other interface, and means for modulating the AIS signal so that the modulation pattern communicates information to establish matching communication protocols between said interface devices.

2. The system of claim 1 further comprising a means for receiving a modulated AIS and for demodulating the modulated AIS.

3. The communication system of claim 2 wherein the AIS is modulated at a frequency that is less than the frequency at which the AIS would no longer be recognized as an AIS by the receiving interface device.

4. A first interface device for connecting a user to a communication link, said first interface device comprising:

means for generating an alarm indication signal (AIS) on the communication link, the AIS normally indicating that the first interface device is not available for communication; and means for modulating the AIS signal, the modulation of the signal comprising information specifying configuration information to enable a second interface device to communicate with the first interface device.

5. The interface of claim 4 further comprising a means for receiving a modulated AIS and for demodulating the modulated AIS.

6. A method for communicating configuration information from a first interface device to a second interface device in a communication system in which the first and second interface devices are connected via a communication link, each said interface device having a plurality of communication modes and each said interface device including means for sending and receiving an alarm indication signal (AIS) indicating that the interface sending the AIS is not available for communication, comprising the steps of:

generating an AIS signal having a modulation pattern that identifies one of a plurality of communication formats for transmitting between said first and second interface devices; and transmitting the modulated AIS on the communication link.

7. The method of claim 6 further comprising the steps of:

transmitting a first message from said first interface device to said second interface device, the first message comprising the AIS modulated in a first modulation pattern; and waiting for a predetermined response to be received by the first interface device.

8. The method of claim 7 wherein the predetermined response is the AIS modulated in the first modulation pattern.

* * * * *